United States Patent [19]

Boeker

[11] Patent Number: 5,203,947
[45] Date of Patent: Apr. 20, 1993

[54] RADIALLY EXPANDABLE TIRE FORMING DRUM

[75] Inventor: Pat A. Boeker, Tokyo, Japan

[73] Assignee: Bridgestone Corporation, Tokyo, Japan

[21] Appl. No.: 936,206

[22] Filed: Aug. 27, 1992

[30] Foreign Application Priority Data

Oct. 7, 1991 [JP] Japan .................................. 3-259247

[51] Int. Cl.[5] ............................................. B29D 30/24
[52] U.S. Cl. ..................................... 156/417; 156/414
[58] Field of Search ....................... 156/414, 415, 417; 264/328.3; 425/31

[56] References Cited

U.S. PATENT DOCUMENTS

| | | | |
|---|---|---|---|
| 3,178,331 | 4/1965 | Bishop et al. | 156/415 |
| 3,817,812 | 6/1974 | Yabe | 156/415 |
| 3,873,398 | 3/1975 | Yokoo et al. | 156/417 |
| 3,888,720 | 6/1975 | Habert | 156/417 |
| 3,948,717 | 4/1976 | Suzuki et al. | 156/415 |
| 4,547,251 | 10/1985 | Landsness | 156/415 |
| 4,772,351 | 9/1988 | Thompson et al. | 156/417 |

FOREIGN PATENT DOCUMENTS 60-68929  4/1985  Japan.
60-196330 10/1985 Japan.

*Primary Examiner*—Caleb Weston
*Assistant Examiner*—R. Crispino
*Attorney, Agent, or Firm*—Sughrue, Mion, Zinn, Macpeak & Seas

[57] ABSTRACT

A tire forming drum includes a plurality of main segments arranged around a main shaft of the drum and rotatable together with the main shaft. The main segments are reciprocatingly radially movable toward and away from the main shaft to adjust the diameter of the drum and have circular arc surfaces, respectively, on which a tire constituent member is wrapped. The tire forming drum further includes subsegments having plural circular arc surfaces, respectively, to conform to change on diameter of the drum. The subsegments are arranged between the main segments to be movable to fill clearances occurring between the adjacent segments in response to the movements of the main segments.

4 Claims, 5 Drawing Sheets

FIG_2
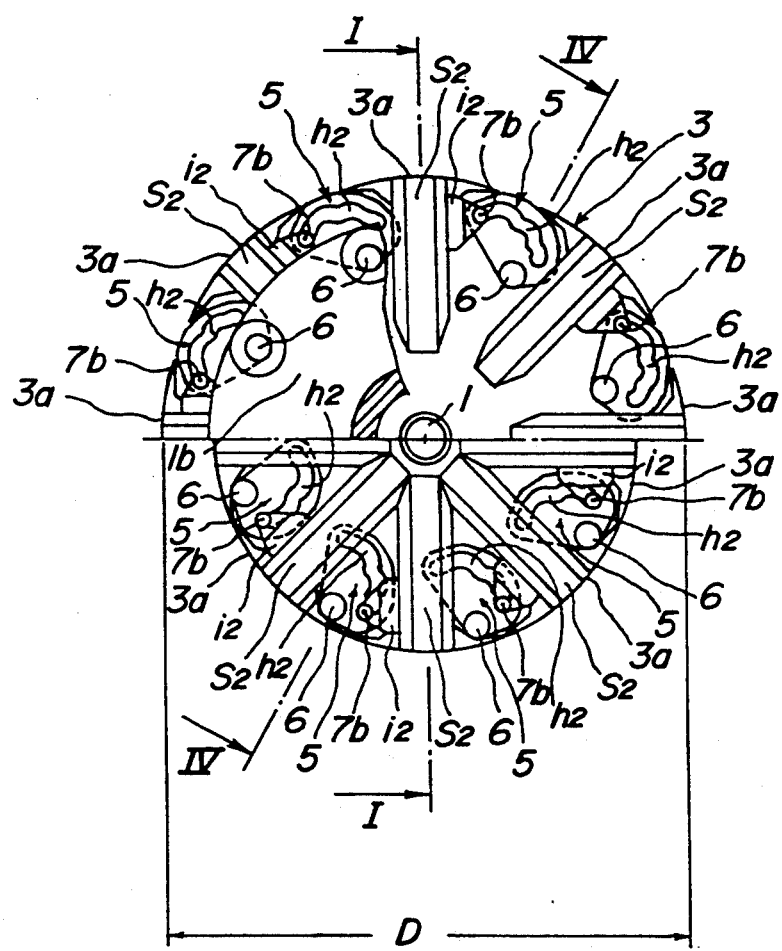

FIG_3
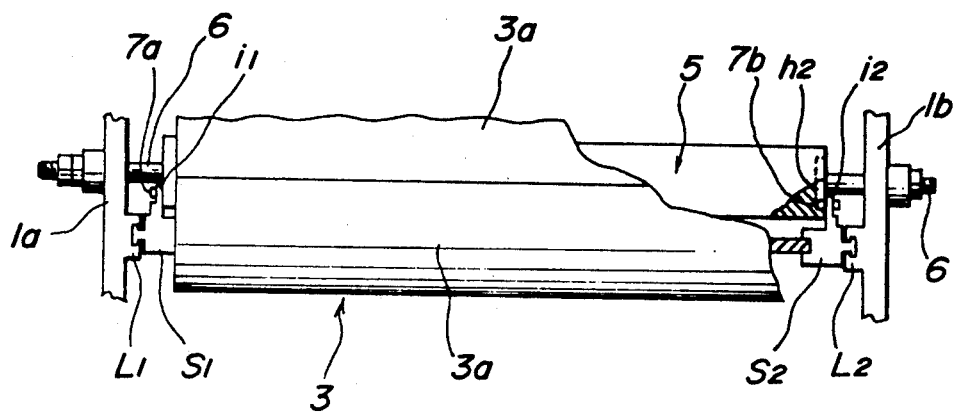
FIG_4
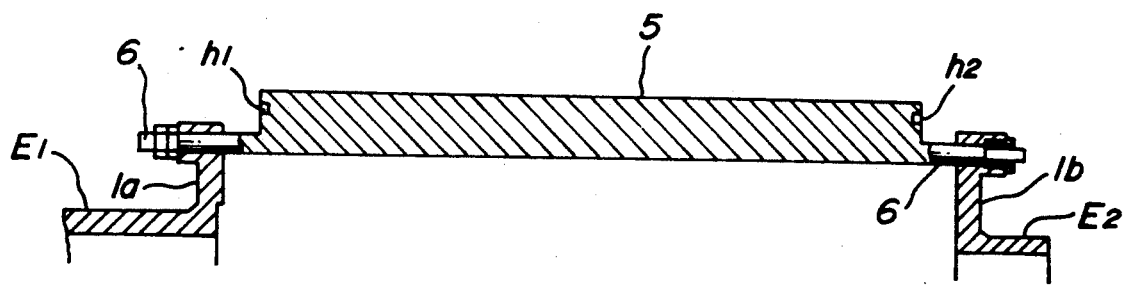

FIG_5
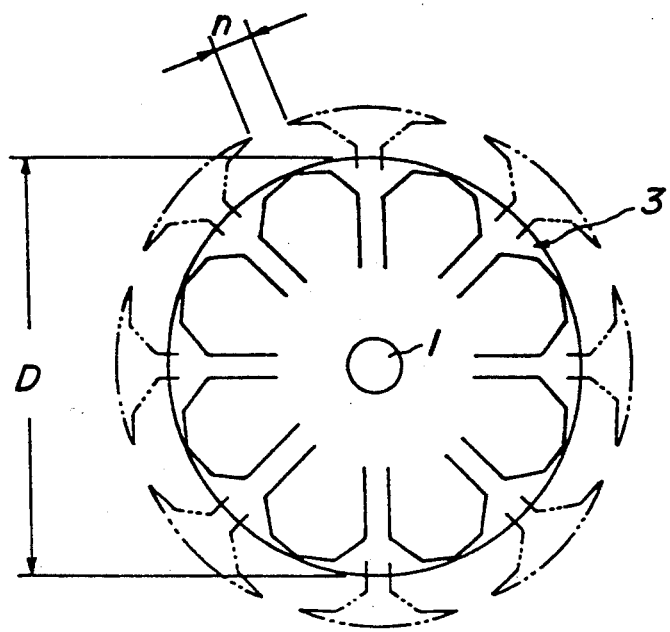
FIG_6
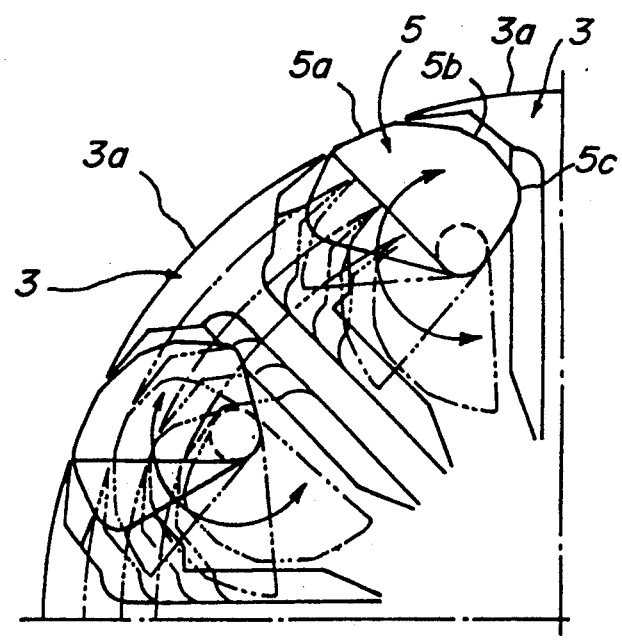

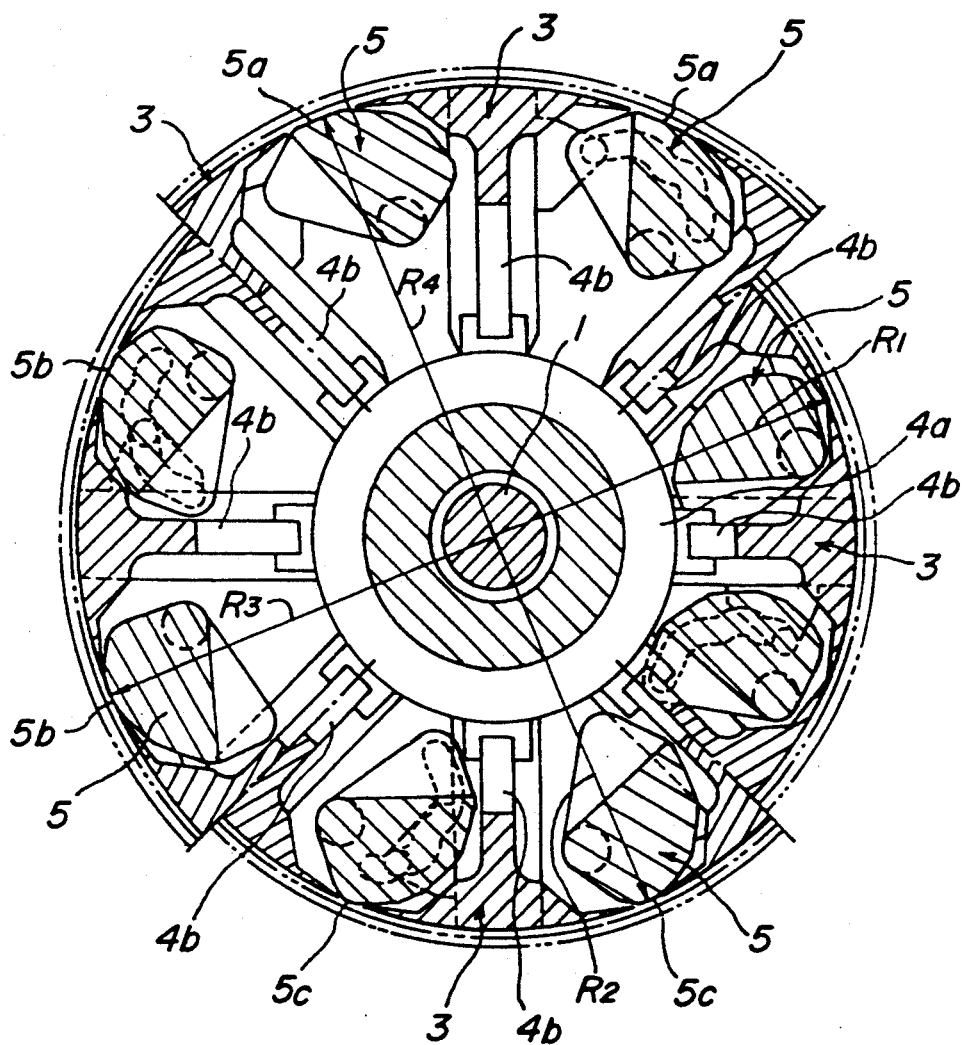
FIG_7

RADIALLY EXPANDABLE TIRE FORMING DRUM

BACKGROUND OF THE INVENTION

This invention relates to an improvement of tire forming drums suitable for forming bands formed by tire constituent members such as inner liners, chafers, plies affixed to each other or green cases produced in primary forming in producing processes mainly for passenger car tires.

In order to improve the productivity of tires, it has been expected to realize a tire forming drum for forming bands or green cases, which is capable of rapidly conforming to change in diameters of tire constituent members to be wrapped around the drum and hence to change in tire rim diameters. In reply to this expectation, various kinds of forming drums have been proposed, which include a plurality of segments arranged around a main shaft and radially movable toward and away from the main shaft and further having circular arc surfaces on which a tire constituent member is wrapped, as disclosed in, for example, Japanese Patent Application Laid-open Nos. 60-196,330 and 60-68,929.

With such proposed forming drums, there are provided means for filling clearances occurring between the adjacent segments when they move. The means for this purpose cannot help being thin plates due to the construction of the drum so that they are generally poor in strength tending to be deformed and damaged in a short period of time. What is worse still, as thin plate members are likely to curve with constant radii of curvature, when the diameter of the drum is largely changed in a broader range, the curvatures of the plate members do not coincide with the curvature of the drum to cause a member wrapped therearound to be deformed at the positions of the plate members.

In another tire forming drum disclosed in U.S. Patent Specification No. 3,873,398, rubber bands are arranged on all the circumference of a drum to fill clearances occurring between adjacent segments moved in accordance with a required drum diameter. In such a known forming drum, however, it is difficult to obtain a broader range of tire rim diameters in which the drums can be commonly used. Moreover, there is a risk of bands and green cases being deformed so that sufficiently high quality tires can not be produced.

SUMMARY OF THE INVENTION

It is a principal object of the invention to provide an improved tire forming drum commonly usable for a wide range of diameters and capable of completely filling clearances produced by movements of segments and exactly conforming curvatures at the filled clearances to a present diameter of the drum in response to the variation in the drum diameter.

In order to accomplish this object, in a tire forming drum including a plurality of segments arranged around a main shaft of the drum and rotatable together with the main shaft, said segments reciprocatingly radially movable toward and away from the main shaft to adjust the diameter of the drum and having circular arc surfaces, respectively, on which a tire constituent member is wrapped, the tire forming drum according to the invention comprises subsegments arranged between the main segments to be movable to fill clearances occurring between the adjacent segments in response to the movements of the segments, said subsegments having plural circular arc surfaces, respectively, to conform to change in diameter of the drum.

According to the invention, the subsegments having circular arc surfaces of various radii of curvatures are arranged between the main segments so as to selectively expose the suitable circular arc surfaces of the subsegments between the main segments in response to change in the drum diameter. Therefore, diameters at the clearances can be always brought into coincidence with the drum diameter so that the commonly usable range of the drum can be remarkably widened. According to the invention, moreover, the subsegments to be filled in the clearances are separately formed from the main segments, and both the ends of the subsegments are rotatably supported by the fixing discs and to assure the sufficient strength of these portions.

The tire forming drum according to the invention can be used for forming bands, green cases and the like of various kinds by the single drum without deteriorating their quality, whereby the cost of equipment can be reduced and the tire production efficiency can be improved.

The invention will be more fully understood by referring to the following detailed specification and claims taken in connection with the appended drawings.

BRIEF DESCRIPTION OF THE DRAWINGS

FIG. 2 is a cross-sectional view of the tire forming drum taken along the line II—II in FIG. 1;

FIG. 3 is a partially removed front view of the tire forming drum shown in FIG. 1;

FIG. 4 is a fragmental sectional view of the tire forming drum taken along the line IV—IV in FIG. 2;

FIG. 5 is a view for explaining the relation between the main segments in increasing the drum diameter;

FIG. 6 is a view for explaining the change in circular arc surfaces of the subsegments; and FIG. 7 is a view illustrating varied states of diameter of the tire forming drum according to the invention in four divided sections.

DESCRIPTION OF THE PREFERRED EMBODIMENTS

Figure 1:
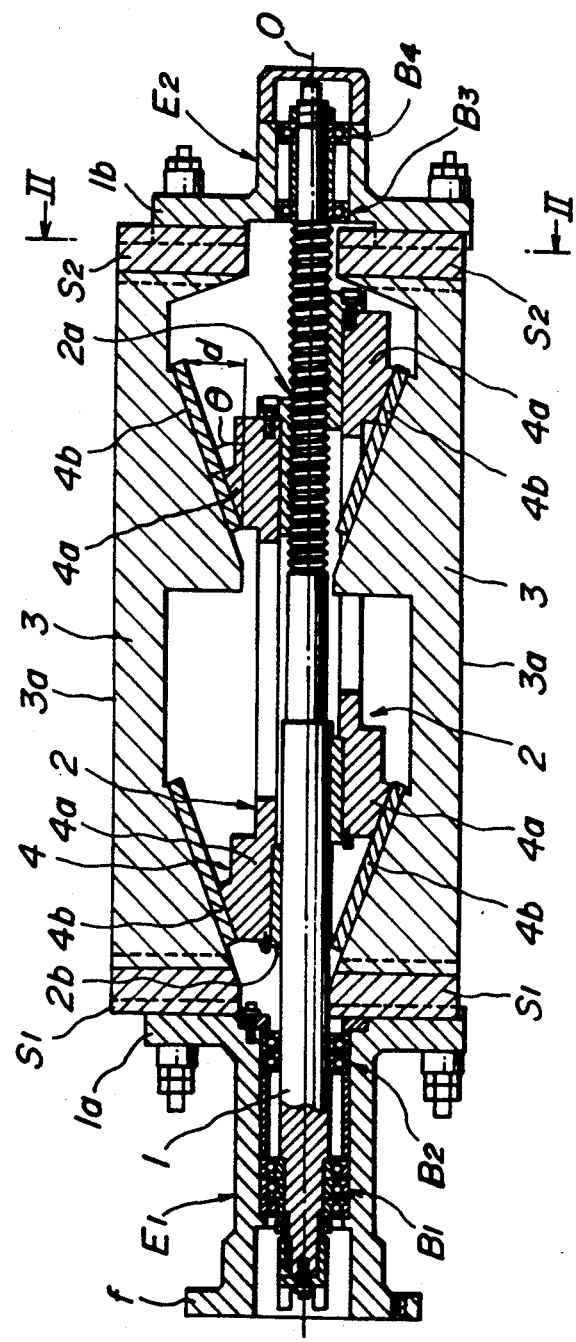
FIG. 1 is a longitudinal sectional view of the tire forming drum according to the invention taken along the line I—I in FIG. 2 for explaining its construction.

FIGS. 1-4 illustrate the constitution of the tire forming drum (referred to as only "drum" hereinafter) according to the invention. The upper and lower halves of FIGS. 1 and 2 show the drum whose diameter has been expanded to the maximum and contracted to the minimum, respectively. A main shaft 1 is rotatably held by bearings B1 to B4 in cylindrical members E1 and E2 having fixing discs 1a and 1b. A cylindrical slide sleeve 2 engages the main shaft 1, for example, through a ball screw 2a and a linear bush 2b and is axially movable along the axis O of the main shaft 1 by rotation thereof. A number of main segments 3 are arranged around the circumference of the main shaft 1. Each of the main segments 3 is formed with a circular arc surface 3a for wrapping thereon a tire constituent member and is connected with both the ends to slide blocks S1 and S2 adapted to be slidably fitted in rails L1 and L2 of the fixing discs 1a and 1b.

Drum expansion and contraction means 4 is provided to change the diameter D of the drum by radially inwardly or outwardly moving the main segments 3 along the rails L1 and L2 formed in the fixing discs 1a and 1b. The drum expansion and contraction means 4 includes sliders 4a fixed to the slide sleeve 2, and rail members 4b fixed to the main segments 3 and permitting the sliders 4a to move along grooves of the rail members 4b. (As an alternative, the sliders 4a may be fixed to the main segments 3 and the rail members 4b may be fixed to the slide sleeve 2.) The drum expansion and contraction means 4 has an inclined angle $\theta$ relative to the axis o of the main shaft 1 to assure the variable radius range d.

Subsegments 5 are arranged between the adjacent main segments 3 so as to fill up clearances in drum surfaces produced by the radial movements of the main segments 3. Each of the subsegments 5 has circular arc surfaces of plural kinds (three surfaces 5a to 5c in the embodiment) which are adaptable to varied diameters D of the drum (FIG. 6) and has grooves h1 and h2 formed in opposite end surfaces (FIG. 2). Rods 6 are rotatably supported by the fixing discs 1a and 1b (FIG. 3). The subsegments 5 are fixed to the rods 6, respectively, and rotatable together with the rods 6.

Rollers 7a and 7b are rotatably held by brackets i1 and i2 provided on the slide blocks S1 and S2 for the main segments 3. The rollers 7a and 7b are fitted in the grooves h1 and h2 in the opposite end surfaces of the subsegments 5. In response to the movements of the main segments 3, the subsegments 5 are driven by the rollers 7a and 7b in the grooves h1 and h2 of the subsegments 5 so that any surfaces of the circular arc surfaces 5a–5c are selectively exposed between the main segments 3 so as to adapt to the existing diameter of the drum.

With a forming drum having, around a main shaft 1, a plurality of segments which move radially to change the diameter of the drum, when the segments move radially outwardly to enlarge the diameter of the drum, clearances n imperatively occur between the segments as shown in FIG. 5. The clearances n progressively enlarge as the diameter D of the drum increases. In order to use such a drum commonly for various kinds of tires different in tire rim diameter in a wide range, it is necessary to eliminate the clearances n between the adjacent main segments in any cases of various kinds of tires and to rapidly arrange members having circular arc surfaces which match drum diameters for the various kinds of tires.

In order to meet such requirements, according to the invention the subsegments 5 having the circular arc surfaces of various radii of curvatures are arranged between the main segments so as to selectively expose the suitable circular arc surfaces of the subsegments 5 between the main segments 3 in response to change in the drum diameter D as shown in FIG. 6. Therefore, diameters at the clearances n can be always brought into coincidence with the drum diameter so that the commonly usable range of the drum can be remarkably widened. According to the invention, moreover, the subsegments 5 to be filled in the clearances n are separately formed from the main segments 3, and both the ends of the subsegments 5 are rotatably supported by the fixing discs 1a and 1b to assure the sufficient strength of these portions.

The operation of the forming drum constructed as described above according to the invention will be explained hereinafter for progressively increasing the drum diameter from the minimum to the maximum.

In the state of the minimum diameter, the slide sleeve 2 is positioned at the rightmost end of the main shaft 1 viewed in the lower half of FIG. 1. In this state, the left end of the main shaft 1 is connected through a clutch or the like to a power source and rotated to move the slide sleeve 2 toward the left viewed in FIG. 1. With the movement of the slide sleeve 2, the sliders 4a of the drum expanding and contracting means 4 connected to the slide sleeve 2 is simultaneously moved toward the left, while sliding on the rails 4b.

As the rails 4b and the sliders 4a of the drum expanding and contracting mechanism 4 are at the angle of $\theta$ to the axis o of the main shaft 1, the slide blocks S1 and S2 together with the respective main segments 3 are moved in the variable radius range along the rails L1 and L2 away from the axis of the main shaft 1 to increase the drum diameter progressively as shown in the upper half of FIG. 1. The subsegments 5 arranged between the main segments 3 are rotated about the axes of the rods 6 and guided by the rollers 7a and 7b to selectively expose the predetermined circular arc surfaces of the subsegments 5 between the main segments 3.

In reducing the drum diameter, the main shaft 1 is rotated by the power source in the reverse direction. In order to rotate the drum itself, the cylindrical members E1 and E2 are rotatably supported by bearings (not shown) and, for example, the flange f of the cylindrical member E, is connected to a driving source to rotate the drum.

In the above embodiment, the subsegments 5 are directly formed in both the surfaces with the grooves h1 and h2. If it is difficult to form the grooves h1 and h2 in both the surfaces of the subsegments 5, the portions formed with the grooves h1 and h2 and the rods 6 may be formed separately from the main bodies of the subsegments 5 and then they may be jointed with each other. While the subsegments 5 are moved to expose their circular arc surfaces in response to the movements of the main segments 3, it will be apparent that separate driving means for driving the subsegments 5 may be provided to selectively change the circular arc surfaces unless they are complicated.

FIG. 7 illustrates the arrangements of the subsegments 5, respectively, corresponding to four different drum diameters in four divided sections of the drum. It is, for example, assumed that the main segments 3 have circular arc surfaces of 180 mm radii of curvatures, the drum can be used to obtain bands of tires having rim diameters of 14, 15, 16 and 17 inches for passenger cars in the states R1, R2, R3 and R4 shown in FIG. 7, respectively.

As can be seen from the above description, the tire forming drum according to the invention can be used for forming bands, green cases and the like of various kinds by the single drum without deteriorating their quality, whereby the cost of equipment can be reduced and the tire production efficiency can be improved.

While the invention has been particularly shown and described with reference to preferred embodiments thereof, it will be understood by those skilled in the art that the foregoing and other changes in form and details can be made therein without departing from the scope of the invention.

What is claimed is:

1. A tire forming drum including a plurality of movable main segments arranged around a main shaft of the drum and rotatable together with the main shaft, said movable main segments reciprocatingly radially movable toward and away from the main shaft to adjust the diameter of the drum and having circular arc surfaces, respectively, on which a tire constituent member is wrapped, wherein said tire forming drum comprises subsegments arranged between the movable main segments so as to fill clearances occurring between the adjacent main segments in response to the movements of the main segments, and said subsegments having plural circular arc surfaces, respectively, to conform to change in diameter of the drum.

2. The tire forming drum as set forth in claim 1, wherein the tire forming drum comprises drum expanding and contracting means, said means comprises a cylindrical slide sleeve reciprocatingly movable along the main shaft when the main shaft is rotated, sliders fixed onto the slide sleeve and having outer surfaces inclined to the main shaft, and rail members slidably engaging the sliders, respectively, and fixed to the main segments, respectively.

3. The tire forming drum as set forth in claim 1, wherein the tire forming drum comprises drum expanding and contracting means, said means comprises a cylindrical slide sleeve reciprocatingly movable along the main shaft when the main shaft is rotated, rail members fixed onto the slide sleeve and having rail surfaces inclined to the main shaft, and sliders slidably engaging the rail surfaces of the rail members, respectively, and fixed to the main segments, respectively.

4. The tire forming drum as set forth in claim 1, wherein each of the main segments has opposite ends connected to slide blocks slidably fitted in rails of fixing discs provided at opposite ends of the forming drum, and each of the subsegments is fixed to a rod in parallel with the main shaft so as to be rotatable together with the rod and has grooves formed in surfaces of opposite ends thereof for engaging rollers rotatably supported by brackets provided on said slide blocks, thereby driving the subsegments in response to the movement of the main segments.

* * * * *